United States Patent
Kil et al.

(10) Patent No.: US 10,460,245 B2
(45) Date of Patent: Oct. 29, 2019

(54) FLEXIBLE, PERSONALIZED STUDENT SUCCESS MODELING FOR INSTITUTIONS WITH COMPLEX TERM STRUCTURES AND COMPETENCY-BASED EDUCATION

(71) Applicant: CIVITAS LEARNING, INC., Austin, TX (US)

(72) Inventors: David Kil, Austin, TX (US); Edwin Woo, Austin, TX (US); Clayton Gallaway, Cedar Park, TX (US); Jacob Rios, Austin, TX (US)

(73) Assignee: CIVITAS LEARNING, INC., Austin, TX (US)

( * ) Notice: Subject to any disclaimer, the term of this patent is extended or adjusted under 35 U.S.C. 154(b) by 381 days.

(21) Appl. No.: 15/256,546

(22) Filed: Sep. 3, 2016

(65) Prior Publication Data
US 2017/0068895 A1 Mar. 9, 2017

Related U.S. Application Data

(60) Provisional application No. 62/214,854, filed on Sep. 4, 2015.

(51) Int. Cl.
*G06N 5/02* (2006.01)
*G09B 5/12* (2006.01)
(Continued)

(52) U.S. Cl.
CPC ............. *G06N 5/022* (2013.01); *G06N 7/005* (2013.01); *G06N 20/00* (2019.01); *G09B 5/12* (2013.01); *G09B 7/04* (2013.01)

(58) Field of Classification Search
CPC ........ G06N 5/022; G06N 99/005; H09B 5/12; G09B 7/04; G09B 5/00; G09B 7/00;
(Continued)

(56) References Cited

U.S. PATENT DOCUMENTS 6,801,751 B1 10/2004 Wood et al.
2002/0087346 A1 7/2002 Harkey
(Continued)

FOREIGN PATENT DOCUMENTS

| CN | 102129860 B | * | 7/2012 | |
| WO | WO-2006110892 A2 | * | 10/2006 | ............. G06Q 10/00 |
| WO | WO-2009114649 A3 | * | 1/2010 | ............. G06Q 50/20 |

OTHER PUBLICATIONS

International Preliminary Report on Patentability for corresponding International Application No. PCT/US2016/050307 dated Mar. 6, 2018; 7 pages.
(Continued)

*Primary Examiner* — Scott A. Waldron
*Assistant Examiner* — Casey R. Garner
(74) *Attorney, Agent, or Firm* — Winthrop & Weinstine, P.A.; Nadeem W. Schwen

(57) ABSTRACT

A flexible persistence modeling system and method for building flexible persistence models for education institutions using a Markov model based on units of academic progress of a non-traditional learning program of an education institution. The Markov model is used to quantify transitions of students between the states as parameters of state transitions so that features from the Markov model with the parameters of state transitions can be extracted that are related to the non-traditional learning program of the education institution using defined flexible persistence. The extracted features can then be used to build at least one flexible persistence model for different segments of the students.

24 Claims, 9 Drawing Sheets

(51) Int. Cl.
  *G09B 7/04* (2006.01)
  *G06N 7/00* (2006.01)
  *G06N 20/00* (2019.01)
(58) Field of Classification Search
  CPC .... G06F 11/34; G06Q 10/06; G06Q 10/0637; G06Q 10/0639; G06Q 30/0204; G06Q 10/10; G06Q 30/0203; G06Q 10/06395
  USPC ............... 706/46, 47; 434/350, 129; 705/40
  See application file for complete search history.

(56) References Cited

U.S. PATENT DOCUMENTS

| | | | |
|---|---|---|---|
| 2006/0154226 A1 | 7/2006 | Maxfield | |
| 2006/0259351 A1* | 11/2006 | Yaskin | G06Q 10/06 705/7.38 |
| 2007/0088602 A1* | 4/2007 | Yaskin | G06Q 10/06 705/7.38 |
| 2008/0140491 A1* | 6/2008 | Jain | G06Q 30/02 705/14.47 |
| 2011/0016067 A1* | 1/2011 | Levchuk | G06Q 50/20 706/12 |
| 2013/0028690 A1 | 1/2013 | Park et al. | |
| 2013/0095461 A1* | 4/2013 | Menon | G09B 7/00 434/322 |
| 2013/0280690 A1* | 10/2013 | Menon | G09B 7/00 434/362 |
| 2013/0288222 A1* | 10/2013 | Stacy | G09B 5/00 434/362 |
| 2014/0195475 A1* | 7/2014 | Levchuk | G06Q 50/20 706/52 |
| 2015/0193699 A1 | 7/2015 | Kil et al. | |

OTHER PUBLICATIONS

International Search Report for corresponding International Application No. PCT/US2016/050307 dated Nov. 28, 2016; 2 pages.

Written Opinion for corresponding International Application No. PCT/US2016/050307 dated Nov. 27, 2016; 6 pages.

Capella University, "Competency-Based Education" http://www.capella.edu/about/why-choose-capella-university/competency-based-education/ Accessed on Aug. 31, 2016; 5 pages.

Johnstone, S. M., "Competency-Based Education Programs versus Traditional Data Management," EducauseReview (May 19, 2014); 8 pages. https://er.educause.edu/articles/2014/5/competencybased-education-programs-versus-traditional-data-management Accessed on Aug. 31, 2016.

Western Governors University, "Program Guidebook, Bachelor of Science, Health Informatics" (2015); 23 pages.

* cited by examiner

| | FALL 2012 | | | | SPRING 2013 | | | | SUMMER 2013 | | | FALL 2013 | | | | SPRING 2014 | | | | SUMMER 2014 | | | DID NOT RETURN IN A YEAR | POPULATION SIZE |
|---|---|---|---|---|---|---|---|---|---|---|---|---|---|---|---|---|---|---|---|---|---|---|---|---|
| | OL1 | OL2 | OL3 | OL4 | OL1 | OL2 | OL3 | OL4 | OL1 | OL2 | OL3 | OL1 | OL2 | OL3 | OL4 | OL1 | OL2 | OL3 | OL4 | OL1 | OL2 | OL3 | | |
| 1 OL1 | 1.7% | 22.4% | 9.8% | 42.0% | 8.5% | 1.2% | 0.6% | 1.4% | 0.3% | 0.4% | 0.4% | 0.5% | | | | | | | | | | | 10.5% | 16658 |
| 2 OL2 | | 1.3% | 27.4% | 34.3% | 14.0% | 2.7% | 1.4% | 1.8% | 0.9% | 0.3% | 0.5% | 0.7% | 0.5% | | | | | | | | | | 14.0% | 9068 |
| 3 OL3 | | | 2.0% | 53.2% | 19.2% | 3.8% | 2.0% | 2.3% | 1.0% | 0.5% | 0.5% | 0.7% | 0.5% | 0.4% | | | | | | | | | 13.8% | 6805 |
| 4 OL4 | | | | 4.3% | 55.7% | 7.4% | 3.6% | 4.4% | 1.5% | 0.8% | 0.8% | 1.3% | 0.5% | 0.5% | 0.7% | | | | | | | | 18.4% | 18317 |
| 5 OL1 | | | | | 1.9% | 21.1% | 9.4% | 42.7% | 4.9% | 1.5% | 1.3% | 2.9% | 0.9% | 0.5% | 0.7% | 0.8% | | | | | | | 11.3% | 19328 |
| 6 OL2 | | | | | | 2.0% | 26.5% | 37.6% | 7.7% | 2.8% | 1.9% | 3.3% | 1.6% | 0.9% | 0.8% | 0.8% | 0.3% | | | | | | 13.7% | 8161 |
| 7 OL3 | | | | | | | 2.7% | 51.7% | 11.4% | 4.0% | 3.1% | 4.8% | 1.9% | 1.2% | 1.4% | 0.9% | 0.5% | 0.4% | | | | | 16.3% | 6511 |
| 8 OL4 | | | | | | | | 6.2% | 27.5% | 12.3% | 8.1% | 12.8% | 3.7% | 1.8% | 2.7% | 2.0% | 0.5% | 0.5% | 1.1% | | | | 20.8% | 18764 |
| 9 OL1 | | | | | | | | | 2.1% | 25.9% | 28.6% | 17.2% | 3.1% | 1.6% | 2.2% | 1.9% | 0.7% | 0.6% | 0.7% | 0.7% | | | 13.8% | 10321 |
| 10 OL2 | | | | | | | | | | 2.0% | 40.2% | 24.4% | 5.4% | 2.6% | 3.8% | 2.5% | 0.8% | 0.6% | 1.0% | 0.7% | 0.4% | | 15.6% | 7671 |
| 11 OL3 | | | | | | | | | | | 3.2% | 44.6% | 11.9% | 5.0% | 6.5% | 3.5% | 1.2% | 0.7% | 1.5% | 1.1% | 0.5% | 0.5% | 19.8% | 10398 |

FIG. 4

FLEXIBLE, PERSONALIZED STUDENT SUCCESS MODELING FOR INSTITUTIONS WITH COMPLEX TERM STRUCTURES AND COMPETENCY-BASED EDUCATION

CROSS REFERENCE TO RELATED APPLICATION

This application is entitled to the benefit of U.S. Provisional Patent Application Ser. No. 62/214,854, filed on Sep. 4, 2015, which is incorporated herein by reference.

BACKGROUND OF THE INVENTION

The current predictive models advocated by the Predictive Analytics Reporting (PAR) Framework for higher-education institutions are based on regular term structures, such as semester- or quarter-based academic calendars. These predictive models also rely on a fixed set of predictors common across many institutions. U.S. Patent App. Pub. No. 2015/0193699 A1, titled "Data-Adaptive Insight and Action Platform for Higher Education," published on Jul. 9, 2015, describes a data-adaptive approach to model building that leverages all available student-data footprints at a particular institution.

However, in higher education, growing number of institutions serve a diverse group of students, such as working adults and students who want more flexibility in schedule through online learning. Furthermore, these institutions are introducing competency-based learning (CBL) as an alternative to time-based learning models to cater to students with varying academic capabilities and time constraints. As a result, students can enroll in flexible terms and make academic progress at their own rate depending on their family and work obligations.

Currently, CBL-related research and development topics are focused on mapping personalized learning processes to facilitate CBL module/content development and personalized learning feedback. U.S. Patent App. Pub. No. 2002/0087346, titled "Utilization of Competencies as Drivers in a Learning Network," published on Jul. 4, 2002, describes a learning network consisting of competency nodes that can be linked to an individual learner so that the learning patterns of both expert and novice learners' can be accommodated. U.S. Patent App. Pub. No. 2006/0154226 A1, titled "Learning Support Systems," published on Jul. 13, 2006, describes a hierarchical learning competency map, which can be leveraged to provide personalized learning guidance based on how students perform on various preparation and competency tests. U.S. Pat. No. 6,801,751 B1, titled "Interactive Learning Appliance," issued on Oct. 5, 2004, describes a system that adapts learning materials to the user's intelligence and other characteristics including user performance information. "Competency-Based Education Programs versus Traditional Data Management" by Sally M. Johnstone (2014) describes CBL programs in the context of data management so they can use the current Student Information System (SIS) and Learning Management System (LMS) platforms to encode student progress in CBL.

Unfortunately, none of these systems provide an algorithm to predict the user's pace of progress and flexible persistence in competency-based education. Furthermore, current predictive models optimized for fixed-term structures are not capable of dealing with such flexible term and learning structures. Thus, there is a need for accommodating such nuanced term structures and learning modalities in predictive algorithms so that timely and accurate predictive insights, along with outreach recommendations, can be provided. Moreover, such predictive insights are of paramount importance in assessing the integrity of the curriculum model and continuously improving CBL courseware structures by understanding the relationships between mastery of competencies and future competency masteries.

SUMMARY OF THE INVENTION

A flexible persistence modeling system and method for building flexible persistence models for education institutions using a Markov model based on units of academic progress of a non-traditional learning program of an education institution. The Markov model is used to quantify transitions of students between the states as parameters of state transitions so that features from the Markov model with the parameters of state transitions can be extracted that are related to the non-traditional learning program of the education institution using defined flexible persistence. The extracted features can then be used to build at least one flexible persistence model for different segments of the students.

A method for building flexible persistence models for education institutions in accordance with an embodiment of the invention comprises translating units of academic progress of a non-traditional learning program of an education institution into states of a Markov model, instantiating the Markov model to quantify transitions of students between the states as parameters of state transitions, defining flexible persistence in terms of state-transitional characteristics of the students using the Markov model with the parameters of state transitions, wherein the flexible persistence indicates student enrollment from one collection of academic progress units to another collection of academic progress units, extracting features from the Markov model with the parameters of state transitions that are related to the non-traditional learning program of the education institution using the defined flexible persistence, and building at least one flexible persistence model using the extracted features for different segments of the students. In some embodiments, the steps of this method are performed when program instructions contained in a computer-readable storage medium are executed by one or more processors.

A flexible persistence modeling system in accordance with an embodiment of the invention comprises memory and a processor configured to translate units of academic progress of a non-traditional learning program of an education institution into states of a Markov model, instantiate the Markov model to quantify transitions of students between the states as parameters of state transitions, define flexible persistence in terms of state-transitional characteristics of the students using the Markov model with the parameters of state transitions, wherein the flexible persistence indicates student enrollment from one collection of academic progress units to another collection of academic progress units, extract features from the Markov model with the parameters of state transitions that are related to the non-traditional learning program of the education institution using the defined flexible persistence, and build at least one flexible persistence model using the extracted features for different segments of the students.

Other aspects and advantages of the present invention will become apparent from the following detailed description, taken in conjunction with the accompanying drawings, illustrated by way of example of the principles of the invention.

BRIEF DESCRIPTION OF THE DRAWINGS

FIG. 4 is an illustration of real-world enrollment patterns in accordance with an embodiment of the invention.

DETAILED DESCRIPTION

Figure 1:
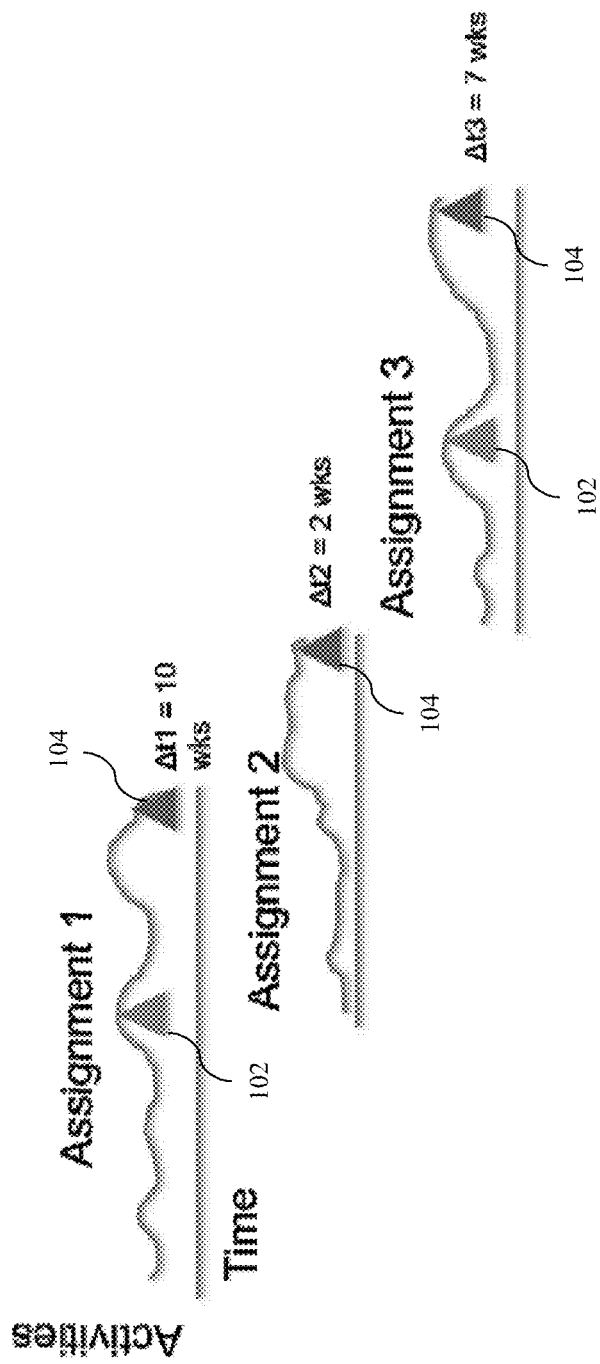
FIG. 1 is a diagram of a student going through three assignments for a direct assessment content-based learning (CBL) program.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Today's persistence models for higher-education institutions focus on term-to-term, fall-to-fall (year over year), or seasonal continuation prediction contingent upon fixed-term structures. For institutions with flexible term structures, but no competency-based learning (CBL), students can enroll in a term, finish the term, skip the next term especially if consecutive terms are overlapped, and then enroll in some future terms. In some institutions, they use a fixed-term structure, but with a number of overlapping or non-overlapping sessions within a term, where enrollment is at the session level.

In CBL, there is no fixed term in a traditional sense. In one implementation of CBL, each course has multiple CBL modules called competency units (CUs), where a student must master a CU to advance to the next one (see Western Governors University's Program Guidebook (2015)). This is called a credit-bearing CBL program where there is a direct CU-to-credit equivalence for financial aid reasons.

In another implementation, an assignment measures multiple competencies with a course comprising N assignments and M competencies, where M>N (see Capella University's Competency-Based Education (2015)). That is, each assignment measures multiple competencies simultaneously. This is called direct assessment program.

Direct assessment CBL programs are based on assignments graded by subject-matter experts working as a team. In this instance, two (2) to three (3) competencies may be mapped to an assignment, meaning that one of the possible outcomes is that students can exhibit mastery on some of the competencies, but not all. In general, students who show enough mastery are allowed to advance to the next-level assignment, but cannot take it until they pass all competencies in the previous assignment. However, for some assignments, student may be allowed to work on different assignments simultaneously, as illustrated in FIG. 1, which is an example of a student going through three assignments with overlap between assignments 1 and 2. In FIG. 1, triangles 102 denote failed assignments and triangles 104 denote passed assignments.

Figure 2:
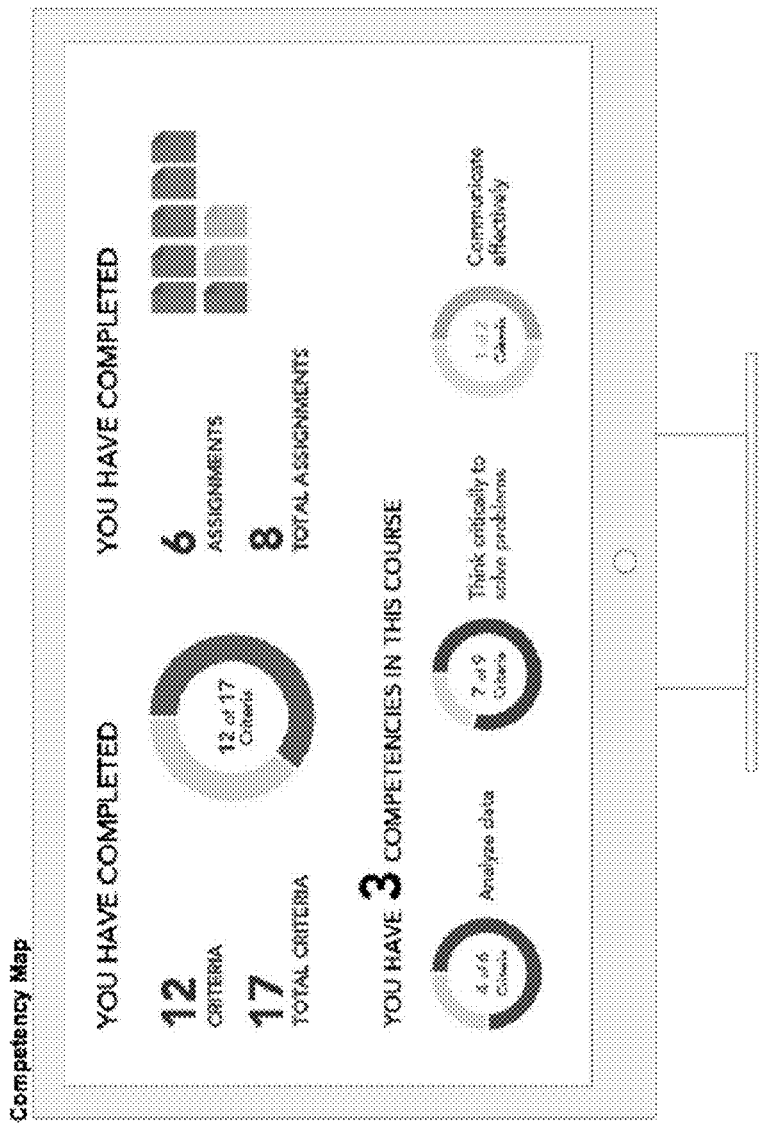
FIG. 2 is a competency map from Capella University for its competency-based education program.

An even more flexible approach is to have a large number of competencies within a course, which students master in recommended pathways with provisions set aside for student-specific mastery pathways (see Capella University's Competency-Based Education). As an example, a competency map from Capella University for its competency-based education program, which is illustrated in FIG. 2, shows that this particular course has 17 criteria or sub-competencies divided into three categories of analyzing data, critical thinking in solving problems, and effective communications. These 17 criteria are distributed to 8 assignments.

Therefore, two metrics associated with student success in CBL are CU or assignment mastery and time it takes to demonstrate mastery and advance to the next CU or assignment.

Figure 3:
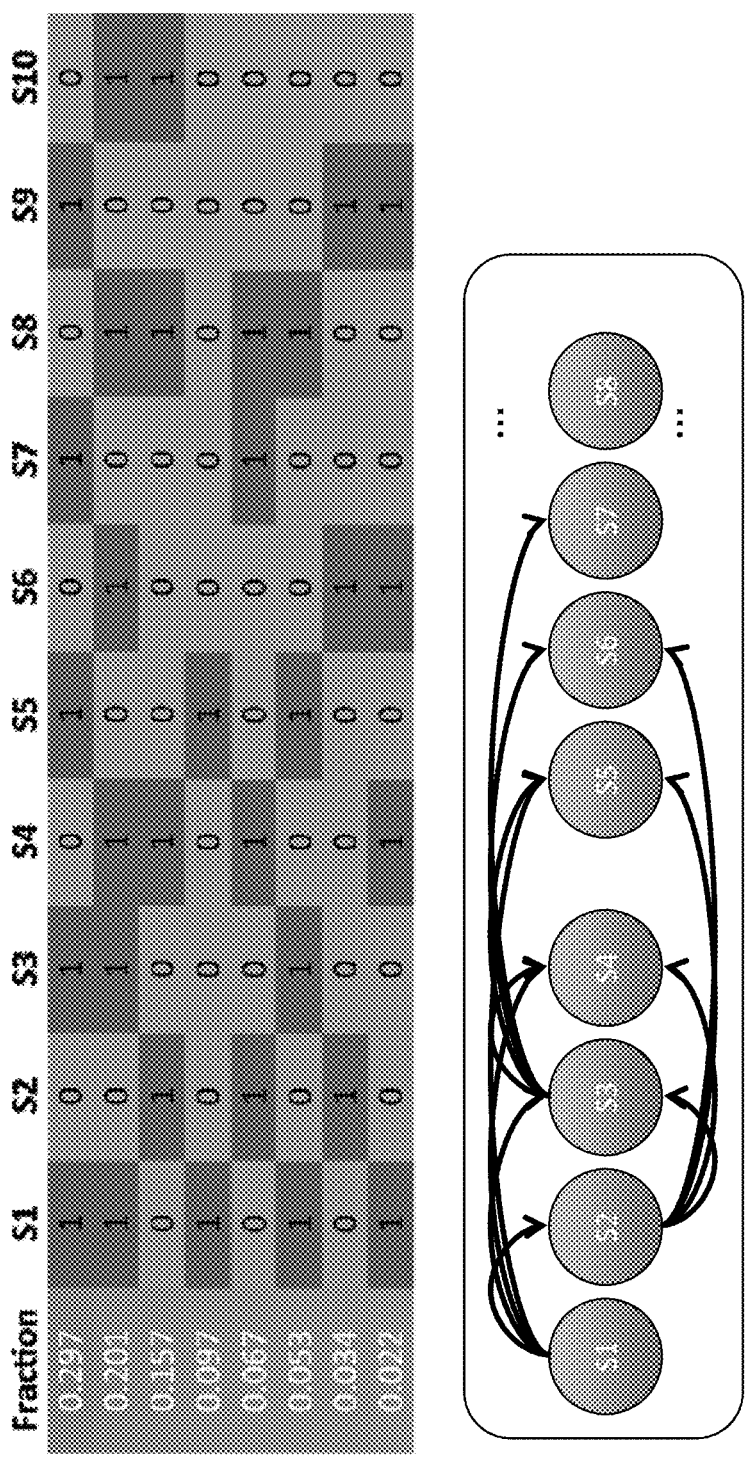
FIG. 3 is conceptual diagram, where unique-enrollment patterns are calculated from each student's binary enrollment pattern along with their fractions in accordance with an embodiment of the invention.

In order to accommodate such structures of non-traditional learning programs of higher-education institutions, embodiments of the invention first start with flexible terms and create a Markov model consisting of state-occupancy and state-transition probabilities. Here, each term at time t is a state s(t) and probability of state s(t) or p(s(t)) and probability of state transition from state s(t) to state s(t+1) or p(s(t+1)|s(t)) are computed using all historical students. FIG. 3 shows a conceptual diagram, where unique-enrollment patterns are calculated from each student's binary enrollment pattern along with their fractions. For example, 29.7% of students enroll in odd states, choosing to skip one term between terms, as shown on the top row of the diagram of FIG. 3. From such binary unique-enrollment patterns, Markov model parameters can be derived. For each student starting in S1, the probability of the student enrolling or graduating in future sessions, S2, S3, etc. is computed. Such transition probabilities can be summed up for all students originating in S1 to compute transition probabilities from S1, i.e., P(Si|S1), i>1. The Markov model parameters are shown in heat map in FIG. 4 based on a specific term-to-session mapping.

Next, flexible persistence rates are computed as a function of time using various definitions of students' enrollment patterns. Persistence can have many forms. Term-to-term persistence means that out of N students enrolled in one term, e.g., a fall term, M students enroll in the next term, e.g., the next spring term. In this case, persistence rate=M/N. Fall-to-fall persistence means that out of L students enrolled in the fall term, K students enroll in the following fall term. Here, persistence rate=K/L. In an embodiment, persistence, i.e., from (numerator) and to (denominator) definitions, is encoded using set operators and Markov or state transition probabilities, p(s(t+1)|s(t)), which are personalized to each institution and optimized to its business operations for student-outreach services. For instance, skipping overlapping sessions may be OK for some institutions from a persistence perspective. This pattern can be encoded using set operators as follows for students originating in S1 or S2, i.e., denominator=S1→numerator=S2 or S3; S2→S3 or S4 or S5 since S4 can be a summer session. Other institutions may encourage enrollment in at least one of the short summer sessions to help students maintain certain cadence and to improve their probabilities of returning in one of the overlapping fall terms. In this case, the summer sessions can be emphasized to ensure students with low prediction scores to enroll in the summer sessions are flagged as high risk using the flexible persistence definition to help advisors reach out to the right students to prevent summer melt, i.e., students not returning in the fall if the students skip at least one of the summer sessions.

Persistence modeling approach in accordance with embodiments of the invention allows each institution to specify numerator and denominator terms that go into the computation of persistence using a business rule specification language. For example, from =students in {term1 or (term 2 and term 4)}, and to =students in {(term 5 and term 7) or term 6}. This flexible from-to specification approach allows currently unenrolled students to also be modeled by defining the from term (the denominator) to include more than the current active term(s) so that the student services team can reach out to previously enrolled, but currently inactive students based on their persistence probabilities and key drivers for persistence.

FIG. 4 shows real-world enrollment patterns. For each row, the first term or state with a percentage represents the fraction of students who graduates after that term. The other terms or cells beyond the diagonal cell in each row represent probability of transition from state s(t) to different states s(t+Δt), with the final column on the right showing the fraction of students who did not return in a year. This institution was interested in advising currently enrolled students who were at risk of not returning within some future overlapping terms based on their complex, season-dependent outreach rules. The institution also wanted to prioritize reaching out to currently unenrolled students based on their probabilities of enrolling in future terms and success drivers in order to nudge them into returning and finishing the school.

Figure 5:
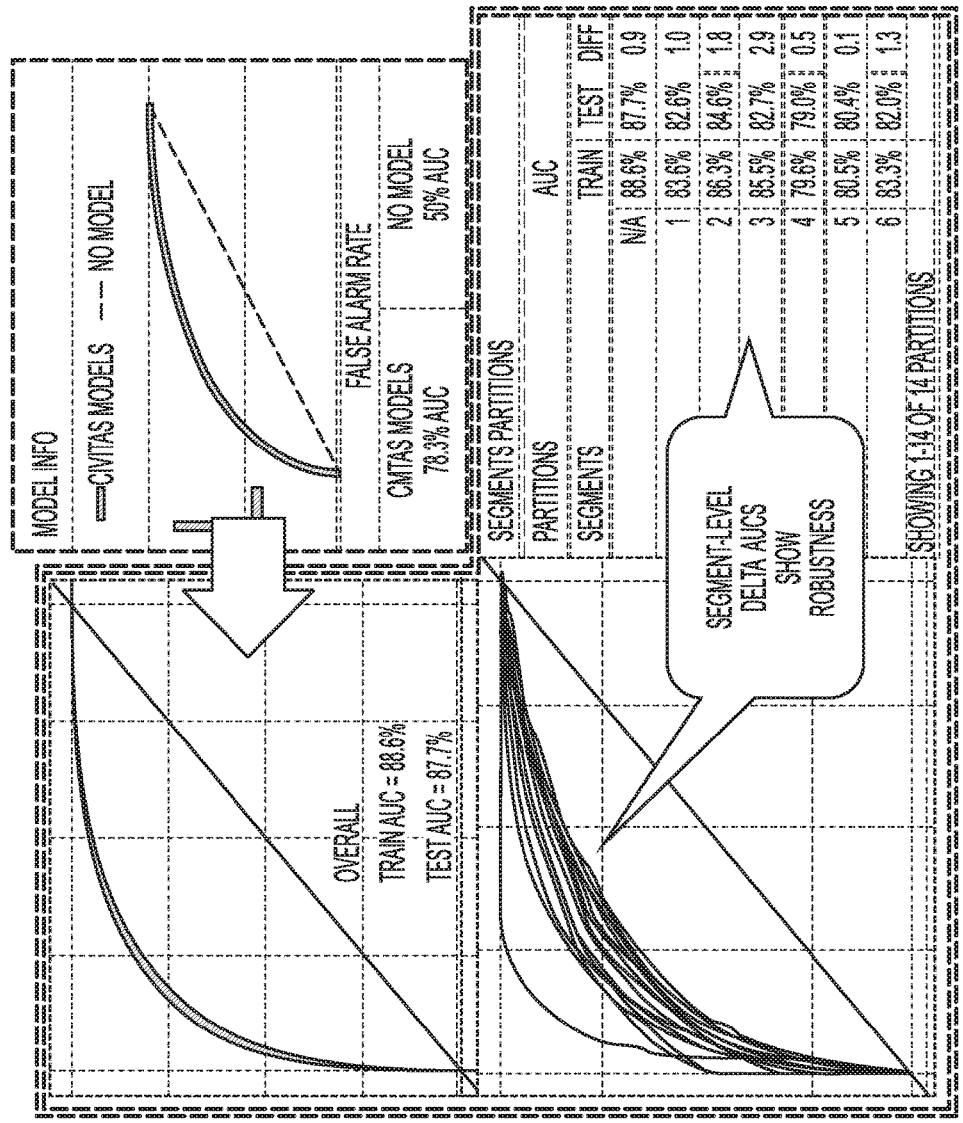
FIG. 5 is an illustration of results that shows improved model accuracy in accordance with an embodiment of the invention.

The fixed-term modeling cannot accommodate such operational scenarios. With the new approach in accordance with embodiments of the invention, predictive models can be built in sync with their student success goals. Furthermore, the models are consistent and synergistic with their outreach business operations. As a result, model accuracy was improved by approximately 10% over a model using a forced fixed-term structure in receiver operating characteristic (ROC) curve's Area Under the Curve (AUC) metric, as shown in FIG. 5. The ROC curve shows the discriminatory power of the persistence predictive models. The larger the AUC, the more accurate the models are in separating persisting students from non-persisting ones.

Figure 6:
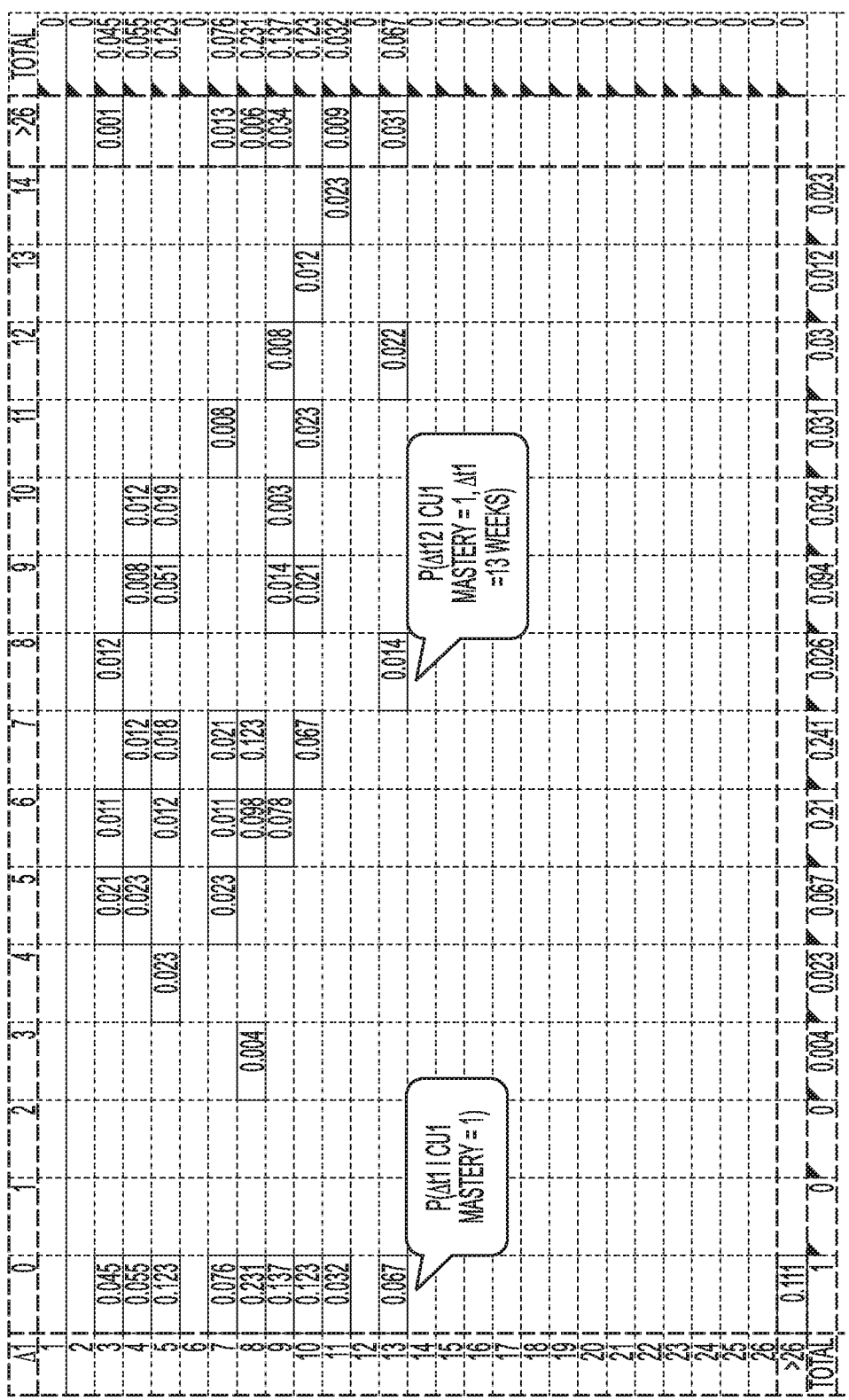
FIG. 6 is a two-dimensional CBL progression representation in accordance with an embodiment of the invention.

For CBL modeling, the Markov model needs to accommodate the time factor conditional on the successful mastery of the prior competency unit (CU) or assignment. This is explained using an example of a credit-bearing course with 2 CUs with reference to FIG. 6, which is a two-dimensional CBL progression representation. FIG. 6 shows the two axes of changes in time or Δt's, where the first column and the first row represent, respectively, the number of weeks it takes for the mastery of the first CU and the time in weeks to master the second CU given the mastery of the first CU. The ">26" column and row represent the fraction of students who do not finish the first and second CUs, respectively.

Figure 7:
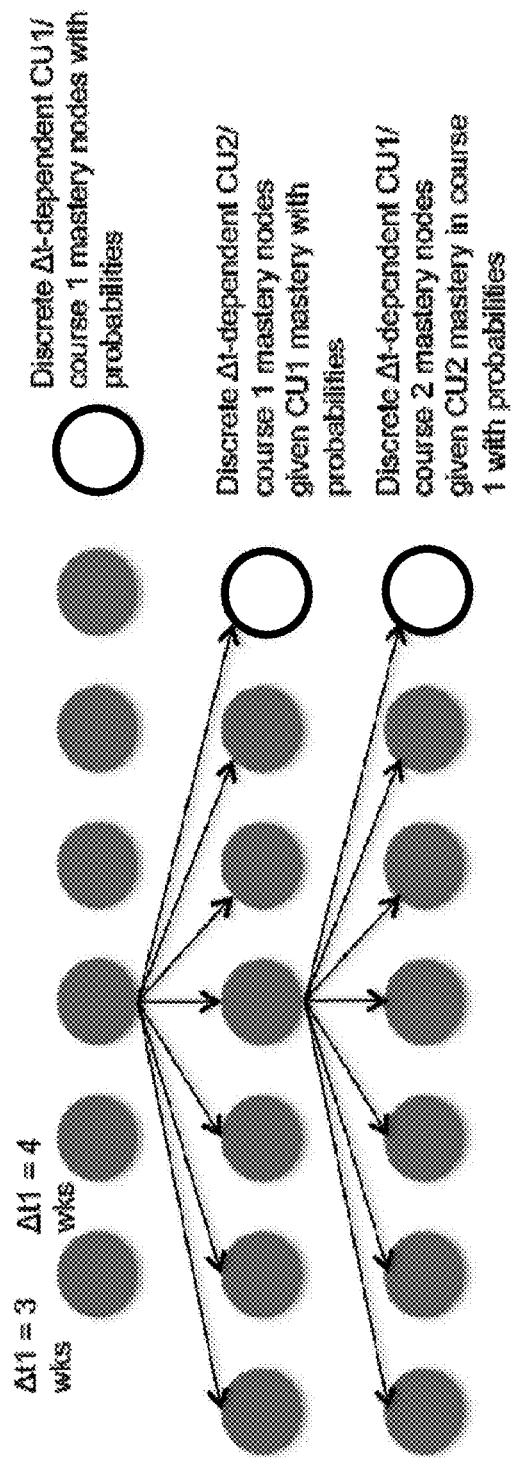
FIG. 7 is a hierarchical tree structure for characterizing both successful competency unit (CU) mastery and persistence into the next course in accordance with an embodiment of the invention.

Courses that require more than 1 CU or assignment will have a hierarchical time-series tree structure, where each Δt node in the first column will spawn a second set of child nodes, with each child node spawning a third set of grandchildren nodes. This hierarchical framework provides an extensible framework for encoding student progress in CBL courses with an arbitrary number of CUs. In order to encompass persistence, one more depth corresponding to the successful mastery of the first CU in the next course needs to be added. Since most courses have two (2) to three (3) CUs or assignments, the tree depth will be three (3) to four (4). FIG. 7 illustrates this hierarchical tree structure for characterizing both successful CU mastery and persistence into the next course. In the hierarchical tree structure of FIG. 7, all the solid nodes represent students persisting or advancing at different speeds and the non-solid nodes represent students that drop out. This hierarchical tree structure can be used to parameterize CBL before building predictive models. The visualization of FIG. 7 shows only one parent node or state at each hierarchical tree depth, which has multiple child nodes or states, but the same structure applies to all the solid nodes. The nodes in the top row represent students completing or not completing CU 1 of course 1. The nodes in the middle row represent students persisting to CU 2 of course 1 given that the students completed CU 1 of course 1. The nodes in the bottom row represent students persisting to CU 1 of course 2 given that the students completed course 1 with 2 CUs, i.e., both CU 1 and CU 2 of course 1.

Leveraging the hierarchical time-series tree structure shown in FIG. 7, dependent variables for prediction can be defined in a flexible manner. Successful mastery of CU and how long it takes to master the CU can be predicted. Conditional outcomes, such as P(successful mastery of the second CU|successful mastery of the first CU in Δt), etc., can also be predicted. Such nuanced multi-modal prediction scores can provide much more powerful context in advising students. For example, knowing that a student will successfully master the first CU can lead to complacency in advising. However, if the predicted Δt can jeopardize the student's success of mastering the next CU, then the advisor can encourage the student to maintain an appropriate pace through the course materials.

In short, by leveraging the flexible data structure, each student's (1) probability of successful master of the current CU or P(successful mastery of the current CU), probability of the time it will take to master the current CU or P(Δt|mastery of the current CU), probability of successful mastery of the next CU given successful mastery of the current CU for particular length of time or P(successful mastery of the next CU|mastery of the current CU, Δt), probability of successful master of all CUs in the current course or P(successful mastery of all CUs in the current course), and probability of persisting into the next course or P(persisting into the next course) can be predicted.

Finally, feature extraction needs to be equally flexible. Most features are term-based, such as prior-term grade point average (GPA), credit hours per term, terms completed, etc. Furthermore, z-score-based comparison features, such as comparing a student's LMS activities with the rest of students in the same section or course, need to be revisited since there is no such fixed comparison basis in flexible-term and CBL modeling.

To compensate for these shortcomings with the current feature extraction, two new concepts are introduced in higher-education model building—time window and data-adaptive comparison basis. Time-window features are based on a sliding window of variable time durations, such as 3, 6, and 12 months from the current date. For example, prior-term GPA can be turned into average mastery score of all CU tests a student has taken over the past 3 months. Similarly, the number of CUs a student has mastered during the most recent 6 months can replace prior-term credits. In addition, features based on section- or course-based comparison basis in the same term, such as relative engagement in a course based on participation in discussion boards by comparing a student's participation level to all students in the same course, is replaced by comparison of students who progress at a similar rate of CU mastery based on their prior 6-month pass rate of CUs. For complex overlapping terms, dynamic time warping widely used in speech processing or anchoring of overlapping sessions in the same course with respect to start dates for course-based comparison basis can be performed. Dynamic time warping (DTW) is a time series alignment algorithm, which aims at aligning two sequences of feature vectors (which may vary in temporal speed) by warping the time axis iteratively until an optimal match (according to a suitable metrics) between the two sequences is found.

Embodiments in accordance with the present invention may include the features of (1) encoding flexible term structures and CBL using Markov and hierarchical time-series tree networks, i.e., a modified Markov model augmented by a hierarchical time-series tree network to encode each individual student's progress and progress rate, (2) flexible dependent-variable modeling using the encoded persistence structures using set operators and (3) predictive algorithms to predict both student outcomes and time to complete CU or assignment in CBL using the created flexible persistence model. In an embodiment, the flexible dependent-variable modeling involves custom specifications of denominators and numerators of persistence rates in defining student success, development of flexible-term dynamic features using sliding time-windows, instead of fixed term structures, and specification of comparison basis using term start-date aligned sections spaced nearby in time.

Figure 8:
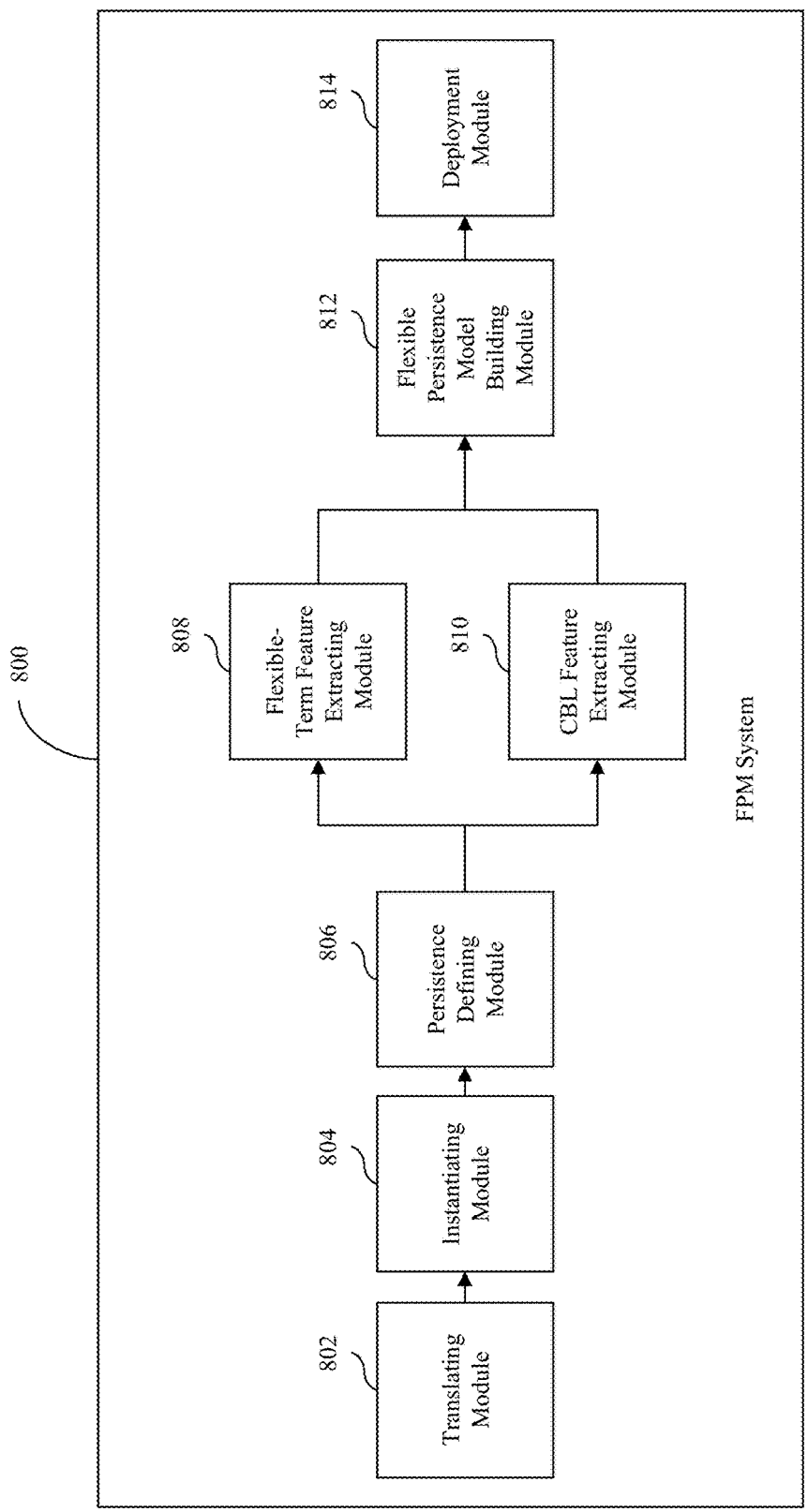
FIG. 8 is a block diagram of a flexible persistence modeling (FPM) system in accordance with an embodiment of the invention.

Turning now to FIG. 8, a flexible persistence modeling (FPM) system 800 in accordance with an embodiment of the invention is shown. The FPM system includes the features described above so that student-success predictive models can be automatically created for education institutions with complex term structures and/or competency-based learning programs. As shown in FIG. 8, the FPM system includes a translating module 802, an instantiating module 804, a persistence defining module 806, a flexible-term feature extracting module 808, a CBL feature extracting module 810, a flexible persistence model building module 812 and a deployment module 814. The components of the FPM system may be implemented in any combination of hardware, software and firmware. In some implementations, these components of the FPM system are implemented as one or more software programs running in one or more physical computer systems using one or more processors associated with the physical computer system. In a particular implementation, each of these physical computer system may be a physical personal computer or a physical server with computer components commonly found in such a machine, such as memories, one or more processors (e.g., central processing units (CPUs)), one or more storage interfaces (e.g., host bus adapters or network file system interfaces) and one or more network interfaces (e.g., network adapters).

The translating module 802 of the FPM system 800 operates to transform units of academic progress of an education institution, which may be defined in the institution's academic calendar, into a Markov or hierarchical tree (MHT) model depending on the flexibility of term or session structures and the rate of progress afforded by competency-based learning, which allows students to progress towards degree at their own pace. The operation of this module is conceptually similar to creating dynamical states corresponding to meaningful milestones in a student's academic journey. In this context, a term can consist of multiple overlapping or non-overlapping sessions, where students can skip a session within a term, for example, without losing financial aid eligibility. In an embodiment, for the flexible term/session program, the translating module is configured to translate the flexible terms/sessions of the program into states of a Markov model so that each flexible term/session corresponds to a collection of states of the Markov model. For the CBL program, the translating module is configured to translate the CUs or assignments of the program into states of a modified Markov model augmented by a hierarchical time-series tree structure so that each CU corresponds to a collection of states of the modified Markov model.

The instantiating module 804 of the FPM system 800 operates to instantiate the Markov model to quantify transitions of students between the states as parameters of state transitions. In an embodiment, the instantiating module estimates the parameters, such as Markov transition probabilities, of the MHT model by analyzing state transition characteristics of students enrolled in various terms or sessions. Since students can skip a session or advance at their own pace, the MHT model instantiation module provides a global view of the flow of students over time.

The persistence defining module 806 of the FPM system 800 operates to define flexible persistence through logical groupings of states, which can be sessions or clusters of students who progress at similar rates, based on the transitional characteristics of students. In an embodiment, the flexible persistence indicates student enrollment from one collection of academic progress units to another collection of academic progress units. This defining of flexible persistence may require collaboration with a particular higher-education institution to ensure that the flexible persistence predictive models can accommodate the institution's business processes in student success initiatives and policies around enrollment, degree pathways, and financial aid disbursement.

The flexible-term feature extracting module 808 of the FPM system 800 operates to extract features using the flexible-term definition parameters in a configuration file, which the flexible-term feature extracting module uses to extract the right features consistent with persistence definitions. Depending on how persistence is defined, there can be different values for features that characterize how many credits a student is taking currently as well as having different target or dependent variables. The flexible persistence definition can also have an impact on data latency, affecting features related to course grades, financial aids, and their temporal trend estimates.

The CBL feature extracting module 810 of the FPM system 800 operates to extract CBL features by clustering students by rate of progress for z-score features. For competency-based learning (CBL), one needs to be careful in extracting z-score features, i.e., features that compare a student's engagement or LMS activities against his or her peers. Here, the CBL feature extracting module relies on the clustering of students based on the rate of progress towards degree to ensure that z-score features remain robust through fair comparison.

The flexible persistence model building module 812 of the FPM system 800 operates to build flexible persistence models leveraging the highly configurable features and target variables for different segments of students based on digital data footprint and the institution's specification on how the institution wants to segment students. For each segment, the flexible persistence model building module performs combinatorial feature ranking, such as least absolute shrinkage and selection operator (LASSO) or add-on/knock-out/Viterbi algorithms, and optimization by identifying the point of diminishing returns on rank-order curves. The rank-order curves show how the model accuracy changes as a function of feature dimension, where feature ordering is based on the importance of each feature as determined through combinatorial feature ranking. It then assigns appropriate learning algorithms based on the underlying probability distributions of the optimal feature subset to ensure that the models are highly accurate, robust, and possess good calibration properties. For example, if the underlying distributions are unimodal, generalized linear models can be used. On the other hand, if the distributions are highly nonlinear with complex boundaries, various forms of neural networks, support vector machines, or nonparametric learning algorithms can be used.

The deployment module 814 of the FPM system 800 operates to perform thorough model performance validation and quality assurance (QA) before deploying the models in production. The deployment module validates and QA model performances by comparing train and test ROC curves for various student segments based on data availability, as well as performing calibration to see how close predictions of the models were to actual outcomes for various prediction-based segments and clusters. If the models do not pass validation and QA, specific student segments that did not pass are identified and features that show substantial mismatch between train and test data are corrected. Once the models pass, then the models are put into a production system.

Thus, embodiments according to the invention comprises two synergistic parts. The first part deals with encoding both flexible term structures and progress rates of individual students. This step is crucial since a mathematically rigorous, yet highly personalized set of success metrics to predict, is needed in order to connect predictive insights to highly effective interventions. The second part deals with extracting derived features by treating a student's data along his or her academic journey as event-based time series regardless of term structures.

The term-encoding algorithm is in large part based on first- or second-order Markov modeling with a hierarchical time-series representation dependent upon previous states, where a state is defined as a flexible unit of progression in an academic journey. For institutions with flexible terms, some of which may overlap or run in parallel, a state can represent, but not restricted to, each term with one or more parameters. For institutions with CBL, a state can represent a competency unit (CU), which students must master before advancing to the next competency unit.

Unlike traditional Markov models, state transition probabilities are encoded as a function of time to reflect variable progression rates. That is, how long it takes a student to advance to the next competency unit or flexible term is computed. One instantiation of this encoding is that the time to complete a competency unit or flexible is made part of the state. Such encoding allows predictive algorithms to be built on binary outcomes (advance or not advance) and duration (how long it takes to advance). Furthermore, this framework facilitates the extraction of dynamical sliding time-window based features as part of building dynamical student success prediction models, instead of relying on static features and learning algorithms.

Higher-education institutions may use prediction scores in the flexible persistence models generated by the FPM system 800 to prioritize the students to which the institutions should reach out. In addition, top predictors in the flexible persistence models can be used to devise outreach strategies in terms of timing, messaging, and engagement. In an embodiment, these predictive insights into who is at risk and why are surfaced through a family of software-as-a-service (SaaS) Web applications for easy, scalable, and cost-effective deployment. Such SaaS applications also facilitate timely model refresh and insertion of new product features as new data becomes available.

Figure 9:
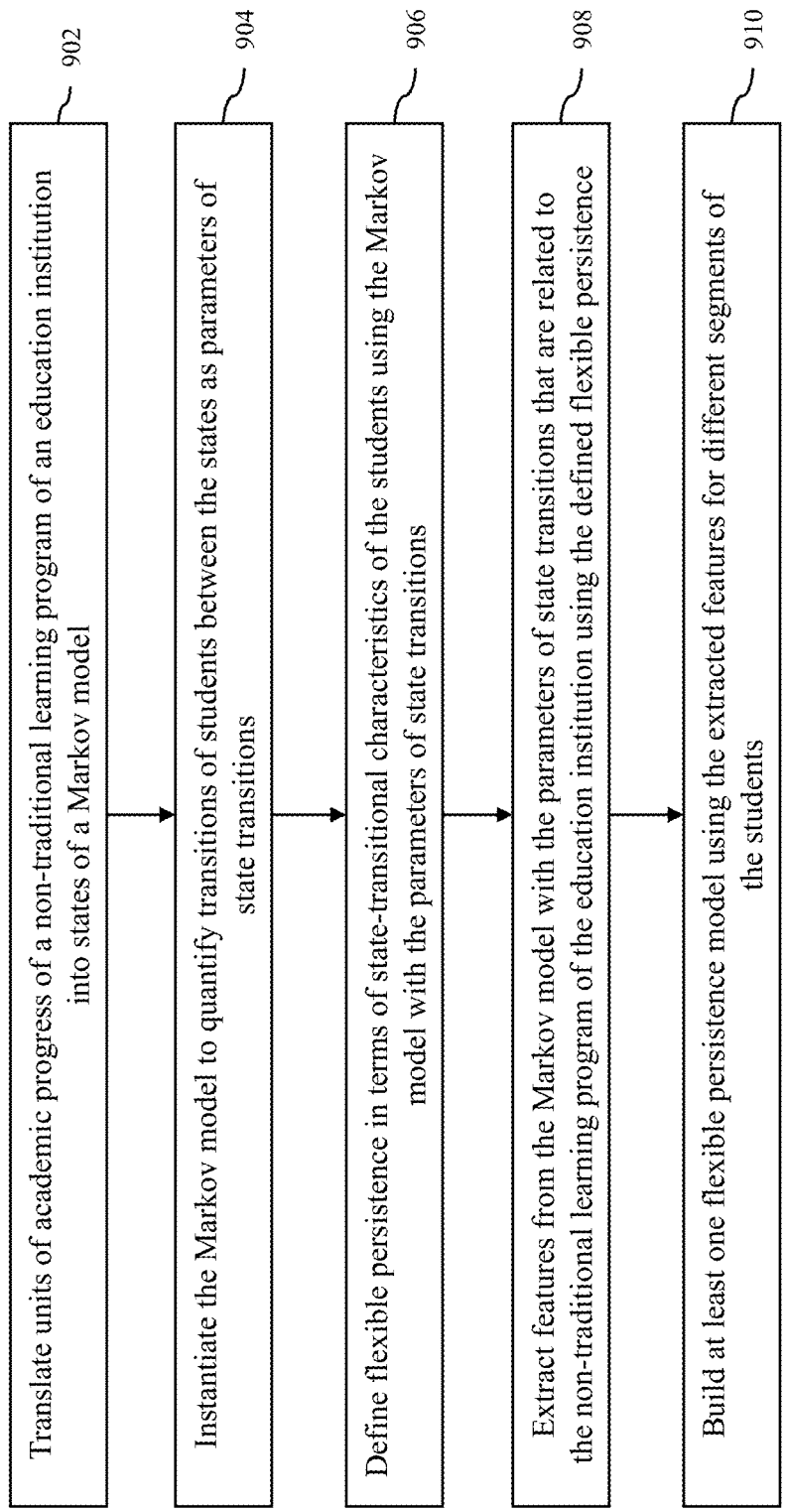
FIG. 9 is a flow diagram of a method for building flexible persistence models for education institutions in accordance with an embodiment of the invention.

A method for building flexible persistence models for education institutions in accordance with an embodiment of the invention is described with reference to a flow diagram of FIG. 9. At block 902, units of academic progress of a non-traditional learning program of an education institution are translated into states of a Markov model. At block 904, the Markov model is instantiated to quantify transitions of students between the states as parameters of state transitions. At block 906, flexible persistence is defined in terms of state-transitional characteristics of the students using the Markov model with the parameters of state transitions, wherein the flexible persistence indicate student enrollment from one collection of academic progress units to another collection of academic progress units. At block 908, features are extracted from the Markov model with the parameters of state transitions that are related to the non-traditional learning program of the education institution using the defined flexible persistence. At block 910, at least one flexible persistence model is built using the extracted features for different segments of the students.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for building flexible persistence models for education institutions, the method comprising:
   translating units of academic progress of a non-traditional learning program of an education institution into states of a Markov model;
   instantiating the Markov model to quantify transitions of students between the states as parameters of state transitions;
   defining flexible persistence in terms of state-transitional characteristics of the students using the Markov model with the parameters of state transitions, wherein the flexible persistence indicate student enrollment from one collection of academic progress units to another collection of academic progress units;
   extracting features from the Markov model with the parameters of state transitions that are related to the non-traditional learning program of the education institution using the defined flexible persistence; and
   building at least one flexible persistence model using the extracted features for different segments of the students.

2. The method of claim 1, wherein translating the units of academic progress of the non-traditional learning program of the education institution into the states of the Markov model includes translating flexible sessions of the non-traditional learning program into states of the Markov model so that each flexible session corresponds to at least one of the states of the Markov model, wherein the flexible sessions are not predefined with respect to sequence.

3. The method of claim 2, wherein extracting the features from the Markov model with the parameters of state transitions includes extracting features related to the flexible sessions of the non-traditional learning program from the Markov model with the parameters of state transitions.

4. The method of claim 1, wherein translating the units of academic progress of the non-traditional learning program of the education institution into the states of the Markov model includes translating competency units of the non-traditional learning program into states of a modified Markov model augmented by a hierarchical time-series tree structure so that each competency unit corresponds to at least one of the states of the modified Markov model.

5. The method of claim 4, wherein the hierarchical time-series tree structure includes parent states representing the students advancing at different speeds for a first competency unit of a course and child states representing the students advancing at different speeds for a second competency unit of the course from the parent states.

6. The method of claim 4, wherein extracting the features from the Markov model with the parameters of state transitions includes extracting features related to the competency units of the non-traditional learning program from the Markov model with the parameters of state transitions.

7. The method of claim 6, wherein the features related to the competency units of the non-traditional learning program are based on a sliding window of time so that the features are derived from the sliding windows of time at different times.

8. The method of claim 7, wherein the features related to the competency units of the non-traditional learning program are based data-adaptive comparison basis so that the features are derived from comparison of the students who progress at a similar rate of competency unit mastery based on the sliding window of time.

9. The method of claim 8, wherein extracting the features from the Markov model with the parameters of state transitions includes using dynamic time warping for overlapping sessions with respect to time or using anchoring of the overlapping sessions for session comparisons.

10. A non-transitory computer-readable storage medium containing program instructions for method for building flexible persistence models for education institutions, wherein execution of the program instructions by one or more processors of a computer system causes the one or more processors to perform steps comprising:
    translating units of academic progress of a non-traditional learning program of an education institution into states of a Markov model;

instantiating the Markov model to quantify transitions of students between the states as parameters of state transitions;

defining flexible persistence in terms of state-transitional characteristics of the students using the Markov model with the parameters of state transitions, wherein the flexible persistence indicate student enrollment from one collection of academic progress units to another collection of academic progress units;

extracting features from the Markov model with the parameters of state transitions that are related to the non-traditional learning program of the education institution using the defined flexible persistence; and building at least one flexible persistence model using the extracted features for different segments of the students.

11. The computer-readable storage medium of claim 10, wherein translating the units of academic progress of the non-traditional learning program of the education institution into the states of the Markov model includes translating flexible sessions of the non-traditional learning program into states of the Markov model so that each flexible session corresponds to at least one of the states of the Markov model, wherein the flexible sessions are not predefined with respect to sequence.

12. The computer-readable storage medium of claim 11, wherein extracting the features from the Markov model with the parameters of state transitions includes extracting features related to the flexible sessions of the non-traditional learning program from the Markov model with the parameters of state transitions.

13. The computer-readable storage medium of claim 10, wherein translating the units of academic progress of the non-traditional learning program of the education institution into the states of the Markov model includes translating competency units of the non-traditional learning program into states of a modified Markov model augmented by a hierarchical time-series tree structure so that each competency unit corresponds to at least one of the states of the modified Markov model.

14. The computer-readable storage medium of claim 13, wherein the hierarchical time-series tree structure includes parent states representing the students advancing at different speeds for a first competency unit of a course and child states representing the students advancing at different speeds for a second competency unit of the course from the parent states.

15. The computer-readable storage medium of claim 13, wherein extracting the features from the Markov model with the parameters of state transitions includes extracting features related to the competency units of the non-traditional learning program from the Markov model with the parameters of state transitions.

16. The computer-readable storage medium of claim 15, wherein the features related to the competency units of the non-traditional learning program are based on a sliding window of time so that the features are derived from the sliding windows of time at different times.

17. The computer-readable storage medium of claim 16, wherein the features related to the competency units of the non-traditional learning program are based data-adaptive comparison basis so that the features are derived from comparison of the students who progress at a similar rate of competency unit mastery based on the sliding window of time.

18. The computer-readable storage medium of claim 16, wherein the features related to the competency units of the non-traditional learning program are based data-adaptive comparison basis so that the features are derived from comparison of the students who progress at a similar rate of competency unit mastery based on the sliding window of time.

19. A flexible persistence modeling system comprising:
memory; and a processor configured to:
translate units of academic progress of a non-traditional learning program of an education institution into states of a Markov model;

instantiate the Markov model to quantify transitions of students between the states as parameters of state transitions;

define flexible persistence in terms of state-transitional characteristics of the students using the Markov model with the parameters of state transitions, wherein the flexible persistence indicate student enrollment from one collection of academic progress units to another collection of academic progress units;

extract features from the Markov model with the parameters of state transitions that are related to the non-traditional learning program of the education institution using the defined flexible persistence; and build at least one flexible persistence model using the extracted features for different segments of the students.

20. The flexible persistence modeling system of claim 19, wherein the processor is configured to translate flexible sessions of the non-traditional learning program into states of the Markov model so that each flexible session corresponds to at least one of the states of the Markov model, wherein the flexible sessions are not predefined with respect to sequence.

21. The flexible persistence modeling system of claim 20, wherein the processor is configured to extract features related to the flexible sessions of the non-traditional learning program from the Markov model with the parameters of state transitions.

22. The flexible persistence modeling system of claim 19, wherein the processor is configured to translate competency units of the non-traditional learning program into states of a modified Markov model augmented by a hierarchical time-series tree structure so that each competency unit corresponds to at least one of the states of the modified Markov model.

23. The flexible persistence modeling system of claim 22, wherein the processor is configured to extract features related to the competency units of the non-traditional learning program from the Markov model with the parameters of state transitions.

24. The flexible persistence modeling system of claim 23, wherein the features related to the competency units of the non-traditional learning program are based on a sliding window of time so that the features are derived from the sliding windows of time at different times.

* * * * *